(12) United States Patent
Hugon

(10) Patent No.: US 6,315,101 B1
(45) Date of Patent: Nov. 13, 2001

(54) CHAIN CONVEYOR, SUCH A CAROUSEL FOR A LOGISTIC INSTALLATION MACHINE, AND A MACHINE SUCH AS FOR SORTING FLAT OBJECTS

(75) Inventor: Jean Hugon, Lyons (FR)

(73) Assignee: Gallet Systemes Automatises, Venissieux (FR)

( * ) Notice: Subject to any disclaimer, the term of this patent is extended or adjusted under 35 U.S.C. 154(b) by 0 days.

(21) Appl. No.: 09/474,979

(22) Filed: Dec. 29, 1999

(30) Foreign Application Priority Data

Dec. 30, 1998 (FR) .................................................. 98 16683

(51) Int. Cl.⁷ .................................................. B65G 17/12
(52) U.S. Cl. .............................. 198/370.07; 198/370.08; 198/812; 198/792; 198/794
(58) Field of Search .................. 198/370.07, 370.08, 198/794, 812, 792, 927

(56) References Cited

U.S. PATENT DOCUMENTS

| | | | |
|---|---|---|---|
| 2,277,593 | 3/1942 | Kohn | 59/79 |
| 2,934,197 | * 4/1960 | Johnson | 198/370.07 |
| 4,072,228 | 2/1978 | Honegger et al. | 198/459 |
| 4,442,932 | * 4/1984 | Sashiki et al. | 198/370.07 |
| 4,731,567 | * 3/1988 | Dands et al. | 198/854 |
| 5,503,264 | 4/1996 | Eberle | 198/803.01 |
| 5,893,447 | * 4/1999 | Brintazzoli | 198/370.07 |
| 6,220,421 | * 4/2001 | Hugon et al. | 198/370.07 |

FOREIGN PATENT DOCUMENTS

| | | | |
|---|---|---|---|
| 919 998 C | 11/1954 | (DE) | 81/145 |
| 0 108 202 A | 5/1984 | (EP) | B61B/13/00 |
| 0 391 575 A | 10/1990 | (EP) | B65G/47/46 |
| 998 359 A | 1/1952 | (FR) | 5/10 |

* cited by examiner

Primary Examiner—Joseph E. Valenza
Assistant Examiner—Mark A. Deuble
(74) Attorney, Agent, or Firm—Nawrocki, Rooney & Sivertson, P.A.

(57) ABSTRACT

A chain conveyor (2), for example a carousel forming an internal revolving stock for a machine (1) for a logistic installation such as for sorting flat objects or a baggage conveyor for an airport environment or similar, the chain of the conveyor (2) being composed of stretches of chain implemented from at least one fixed-length link, distinctly self-conveyed and guided in a guide rail (3), two adjacent stretches being connected notably by a link with variable and/or adjustable pitch, this conveyor having adjustment means (10) and detection means.

20 Claims, 6 Drawing Sheets

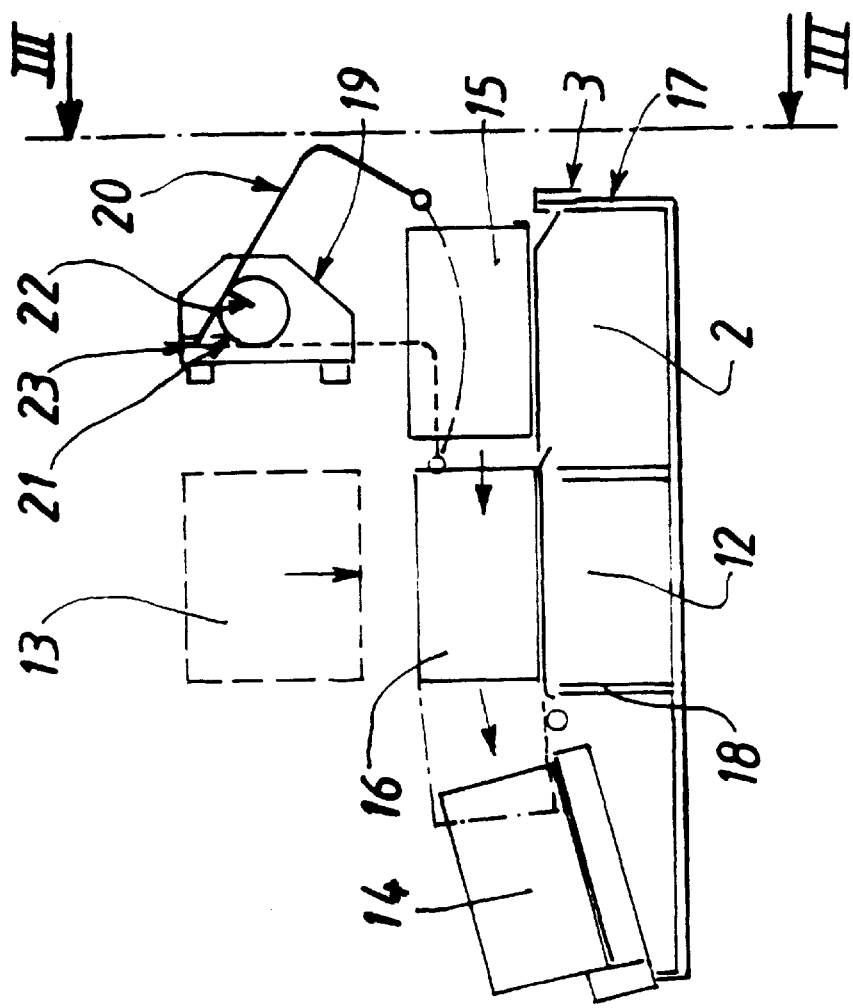
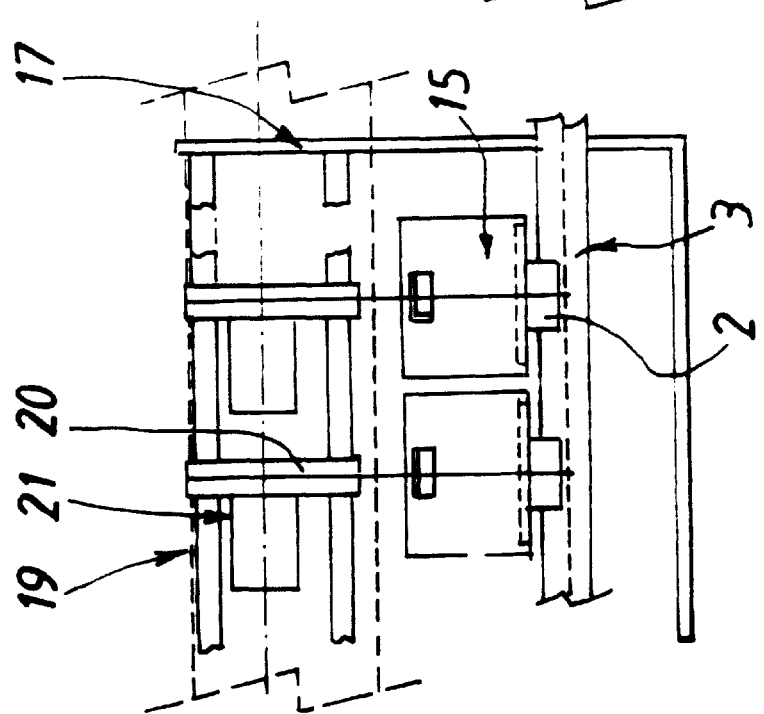

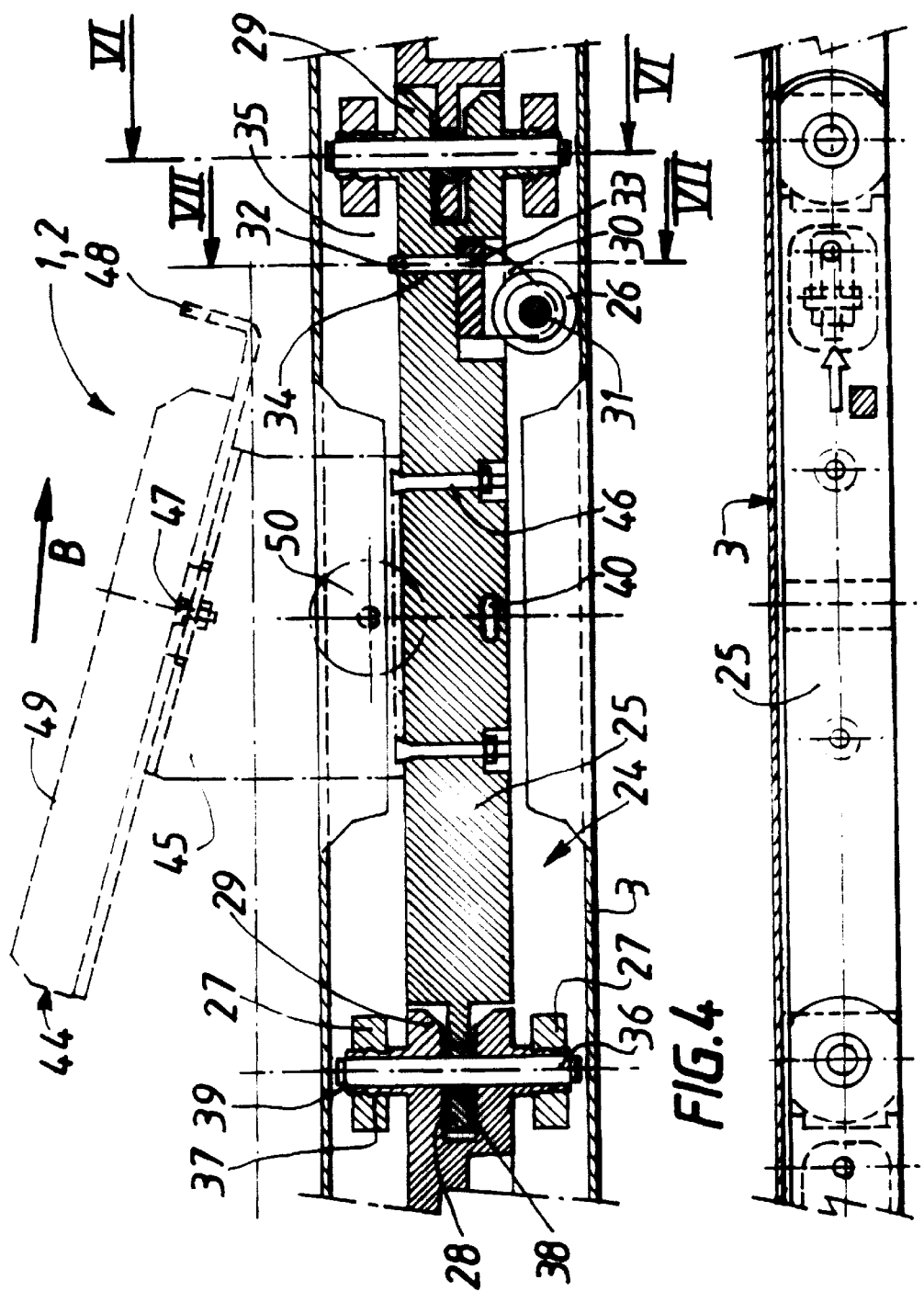

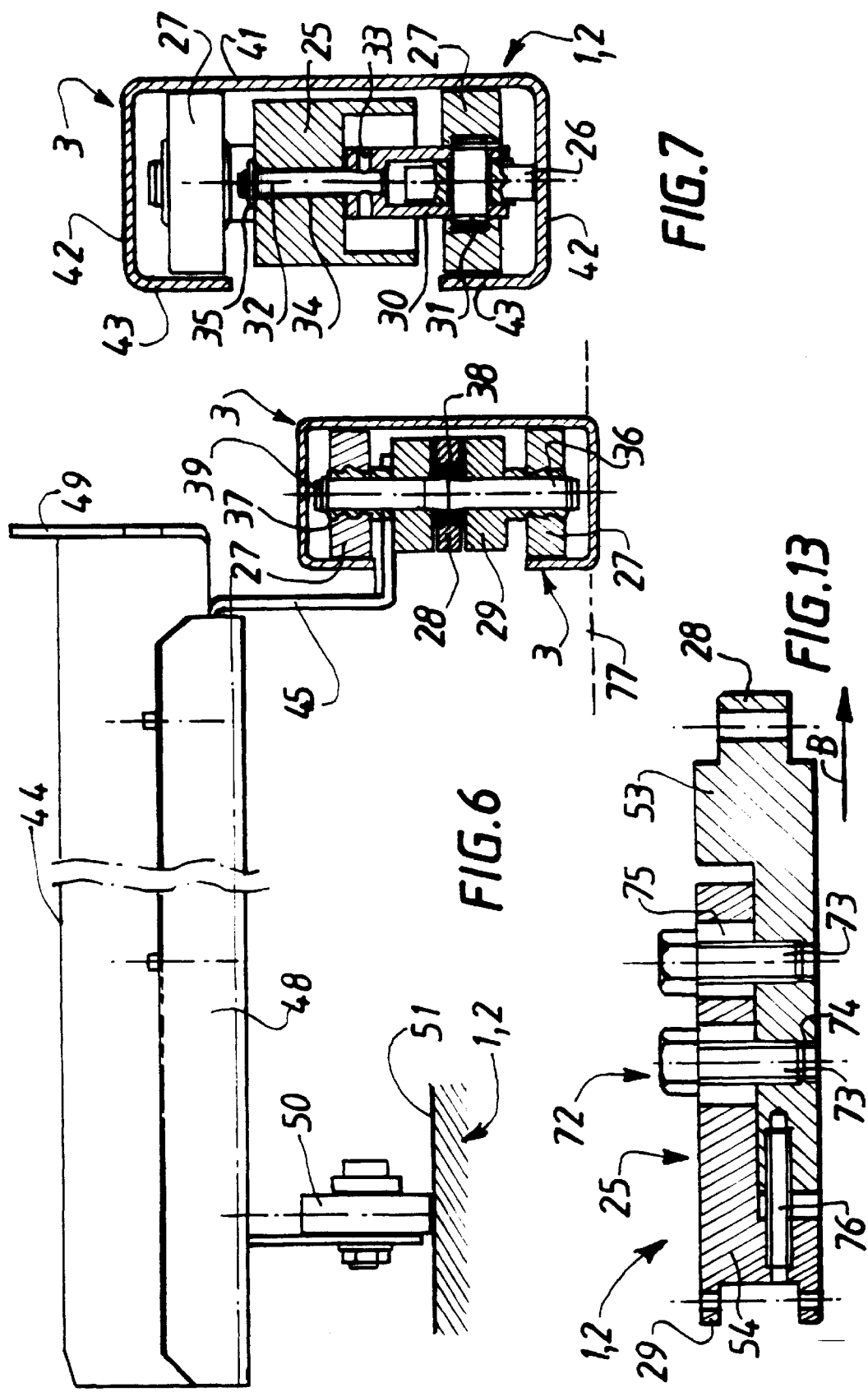

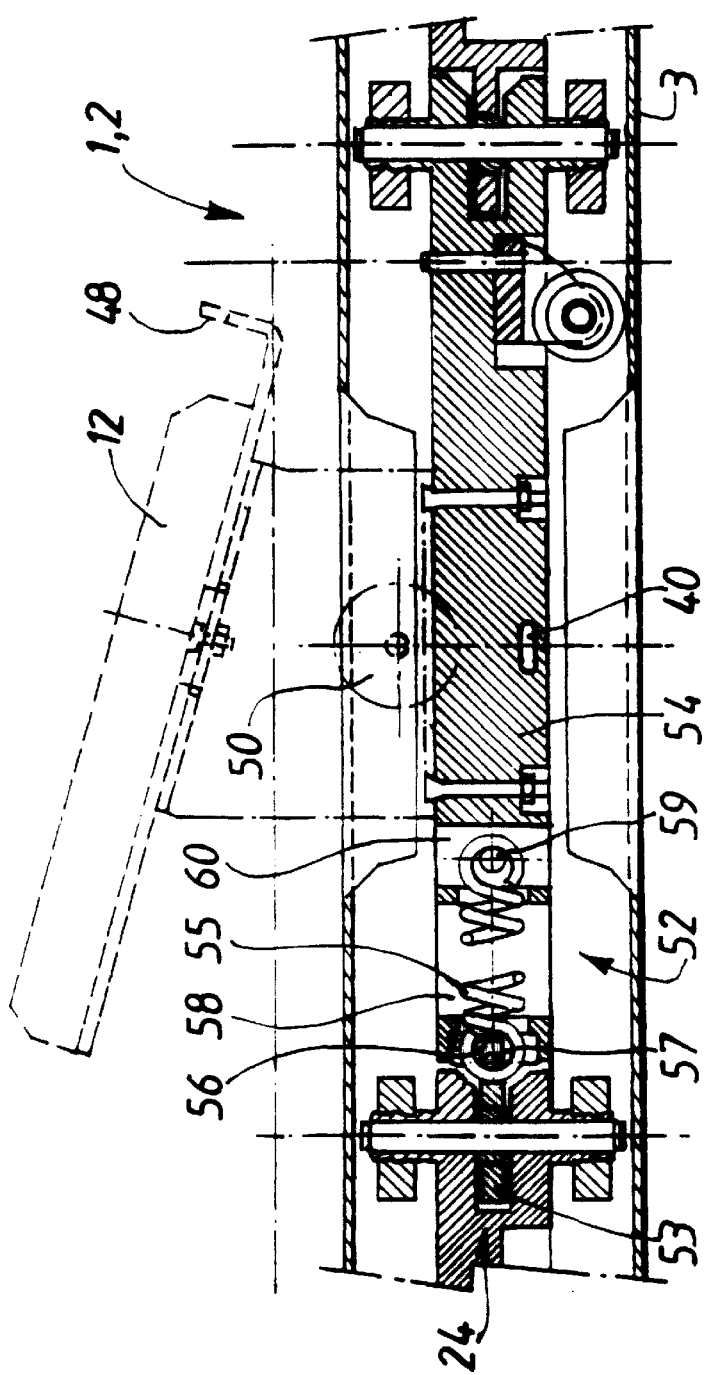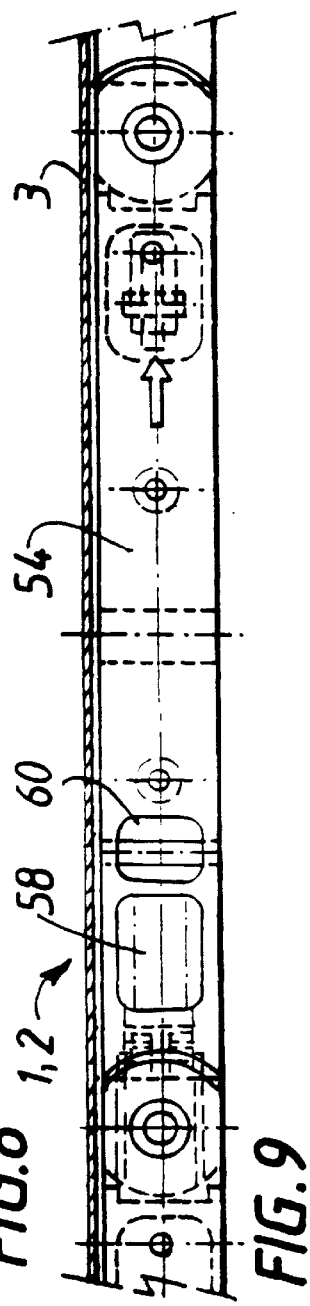
FIG.8
FIG.9

CHAIN CONVEYOR, SUCH A CAROUSEL FOR A LOGISTIC INSTALLATION MACHINE, AND A MACHINE SUCH AS FOR SORTING FLAT OBJECTS

The invention concerns a chain conveyor, for example for a machine for sorting flat objects, and a machine for equipping a logistic platform, such as a mail sorting centre and similar.

In the logistics field, such object sorting machines are known.

The objects conveyed and sorted by the means of the machine must be conveyed to a given destination, and are collected in sorting containers.

In this field can be cited the document FR-97.16.590 which describes a logistic installation machine where a transporter of full containers is moved in front of unloading stations parallel to a conveyor of empty containers.

It is necessary to place the containers, completely individually, under the fixed automatic filling stations, disposed in a straight line.

It is also necessary to remove these containers when they are full of sorted objects.

In this document, a transporter of empty containers is placed along and next to the filling stations.

A removal conveyor is placed along and on the other side of the stations. Each pendular transfer provides a horizontal thrust to the rear of an empty container which comes into contact with the full one.

At the end of the transfer, the empty container is situated in the place of the full one, under the filling, and the full one has been transferred on to the removal conveyor.

This transfer device comprises a pendular lever controlled by a connecting rod driven rotationally by a motorization unit.

The kinematic connection between the connecting rod and the lever is a sliding connection, having the advantage of a movement with no reversal of the direction of rotation of a motorization unit.

Although generally giving satisfaction, notably as regards the transfer device, the known logistic machines have drawbacks.

To illustrate these drawbacks, reference is made to the sorting machine mentioned.

But the invention obviously applies to other objects to be conveyed in the form of revolving stock, as to containers having to be filled with letters.

Thus the conveyors, often disposed laterally towards the outside of the machine, are provided so that the empty containers are moved forward step by step, with disengageable regions.

In practice, these conveyors cannot allow a precise stopping position (of the order of a few mm, for example 5 mm) for the containers, opposite their corresponding stations, short of providing limit stops at each location.

This solution is not economically acceptable, and requires a sometimes excessive size to be managed.

Furthermore, there is often created, as the empty containers are transferred upstream away from the feed conveyor, a dispersal downstream, along useful sections of such conveyors, that is to say along the transfer sections opposite the unloading stations.

This dispersal appears in the form of significant distances which are formed at the time of transferring containers upstream, between two successive containers on the conveyor.

There are then no more empty containers available in the downstream part of the unloading zone.

Furthermore, the known conveyors do not allow an easy solution to the problem of the transportation of containers inclined in the direction of their movement.

Such inclining is frequently desirable inasmuch as it itself provides a precise positioning, oriented along the three geometric axes of the container with respect to the filling bucket conveyor.

The invention aims to overcome these drawbacks notably by providing a central revolving stock of objects to be transferred, available continuously, for example inside a logistic machine.

The continuous availability of objects means that it must allow an endless supply of these objects to and/or from the machine.

According to one embodiment, the invention aims to provide a conveyor providing a precise positioning of the objects at both input and output of the revolving stock.

The input objects must notably be aligned in a precise position in front of the output objects, and vice versa.

On account of the notion of a compartmentalized conveyor, each tray of which is addressed in order to provide parity between the object and its compartment, the invention also has the aim of allowing a high rate of loading/unloading of the objects in the revolving stock from and/or to the logistic machine.

By way of example, some machines provide several hundred loading/unloading stations, and require a rate of the order of one object loaded/unloaded every 4 or 5 seconds.

To that end, a first object of the invention is a closed-loop chain conveyor of three-dimensional objects, for example for a machine for sorting flat objects.

The chain has stretches with links comprising respectively, or each, object receiving means, these links being:

- self-conveyed on a track possibly devoid of directional guides,
- mutually connected by articulations with small positive operating and wear tolerances,
- guided separately from the conveyance, in a guide rail, and
- of fixed pitch, substantially equal to the distance separating two adjacent object loading/unloading positions, these links being referred to as fixed-length links.

At least two adjacent stretches are connected by a so-called "tensioning" variable-pitch link, of structure similar to that of a fixed link, except in that it has tensioning means capable of automatically adjusting the distance between its axes of articulation with two adjacent links, by continuously exerting a tension force tending to bring these axes closer together, the power of which is determined in order to be greater than a maximum motorization power of the chain.

The conveyor has means of detecting the position of a fixed or variable link, with respect to a reference location where the object has to be loaded/unloaded, connected to a motorization of the conveyor for allowing a uniformly varying and smooth slowing down of the chain at the approach to this location, then of stopping the chain at a reduced conveying speed in a precise position facing this location.

The guide rail has at least two curved sections and two rectilinear sections, each curved section having adjustment devices making it possible to move this curve individually, arranged to provide a tensioning of the chain, as well as a relative adjustment of the locating of the straight sections with respect to one another, as soon as the chain is immobilized by the motorization, which also serves as a brake.

Thus, slackening of the chain in one of the curved sections is compensated for by an excess tension in the other, and vice versa.

In another embodiment, instead of the two adjacent stretches connected by a variable-pitch link which has means providing a permanent internal residual tension, these two stretches are connected by an adjustable link which allows play to be taken up without tension.

For example, this embodiment provides a link which has sliding means of connecting its two parts, for adjusting the length of the chain, and means of immobilization at an appropriate pitch, here clamping screws.

It is self-evident that some embodiments have at least one such tensioning link, or at least one link for taking up play, while other embodiments have these two types of link.

Similarly, other embodiments can have only fixed-pitch links.

The stretches with fixed, variable and/or adjustable links, make it possible to concentrate all the tolerances accumulated on one stretch at the connecting links between stretches, and not on each link or articulation, which is more complex.

The overall tolerance on the whole of the chain is therefore equal to the product of the travel available at each variable and/or adjustable link, and the number of stretches in the chain.

Thus, the effective positional error of a particular link is statistically much less than this overall tolerance.

In this way, it can be achieved that the overall positioning error tolerance of a stretch is easily made less than the precision required for the object loading/unloading position.

It should also be noted that, for the tensioning type variable-pitch links, the pitch distance after tensioning of the chain is made substantially equal to a nominal step between two adjacent object loading/unloading positions. This distance is obviously smaller before tensioning.

It is the same for adjustable-pitch links.

The invention thus allows handling for the supply at the input, and the removal at the output, of three-dimensional objects, in which the positioning of the objects is provided precisely, in alignment and continuously, possibly over a number of stages.

Of course, the invention applies to handling structures other than those described, referred to as empty-container carousels.

The invention can notably apply to the conveying and/or the sorting of baggage on airport sites.

In one embodiment, each link of fixed and/or variable and/or adjustable length has on its lower part at least one conveyance roller, for example central, and at least one, and for example two, guide rollers, respectively lower and upper, each roller cooperating with a channel in the guide rail.

In other forms of guidance of the chain, the latter is disposed in two planes with a conveyor which is horizontal and then inclined in order to climb and descend, according to the locations along the conveyor.

Also in one embodiment, each variable-pitch link is divided transversely into two parts connected by tensioning means, for example elastic means such as a spring.

Thus, the elastic means of the different variable-pitch links are arranged in order to, in combination, provide the tensioning of the chain.

In one embodiment, at least one link has sliding means of connecting two parts, for adjusting the length of the chain, and means of immobilization at an appropriate pitch, such as clamping screws, of the two parts with one another.

Also in one embodiment, each link is articulated to one of the adjacent links around the spindle of at least one guide roller.

More particularly, one end of each link here forms a fork or female flange with two branches passed through substantially perpendicularly by the spindle of the guide rollers, and the other end forms a male flange with a hole through it, arranged to fit between the branches of the fork of another link, with the spindle of the guide rollers passing through the hole.

In one embodiment, each link has receiving means for three-dimensional objects such as empty containers.

In one embodiment, the receiving means are neither oriented nor offset laterally, in order to be disposed substantially centred above the chain.

In one example, these receiving means comprise at least one receiving tray, for example inclined in a direction such as that of forward movement of the chain, and a limit stop such as the lower edge of the tray folded up substantially at right angles, this limit stop providing the positional fixing of the object placed on the tray.

More particularly, the receiving tray is mounted projecting over the link, and is provided with an auxiliary conveyance roller, arranged to roll along on a related running path.

In one embodiment, not depicted, at least one link of the chain directly conveys an object, the receiving means then being formed by a part belonging to the link.

In many cases, the conveyor has at least two so-called useful substantially rectilinear sections, with a plurality of inputs and outputs respectively, and at least two curved loop-back sections, arranged as a closed loop.

It has been seen that there is then provided, in each curved section, means for varying the total length of the guide rail.

It should be noted here that this length is less than the nominal length, in the case of a chain equipped with tensioning links.

It is thus possible to adjust this length by tensioning so that, with a predetermined integer number of links disposed on the conveyor, each object is thus placed in front of each loading/unloading station within an amply acceptable precision tolerance.

In some embodiments, not depicted, the conveyor of the invention has more than two rectilinear sections and/or more than two curved sections.

For example, one embodiment provides an arrangement, for example plane, forming a closed loop having a plurality of spokes with a curved section at each end.

In other embodiments, of various forms, for example plane, the conveyor has a number of levels implemented as only one or as a number of closed loops, for example with rectilinear and possibly curved sections, superposed on one another.

Where the conveyor has two substantially rectilinear and parallel sections, and two semicircular loop-back sections, arranged as a closed loop, the means for varying the total length of the adjustment rail are arranged so as to adjust the pitch between the loop-back semicircles.

Each semicircular section is thus adjustable independently, which makes it possible to shift the adjustment of the object destination positions on one side on a rectilinear section, with respect to the rectilinear section on the other side transversely to the conveyor where the chain is kept in a fixed position.

In one embodiment, the drive chain is motorized tangentially directly via the links, by means of at least one electric motor arrangement, with a uniformly varying and smooth movement.

In particular, the motorization means comprise at least one drive roller resting on one of the lateral faces of the chain, and a counter-roller rotating freely or idling, for controlled clamping of the links, disposed on the other side of the chain opposite the drive roller.

In an embodiment other than with the chain oriented on edge, this chain is turned at 90° around its longitudinal axis (compared with the on-edge embodiments) with a tangential motorization on its lower and upper faces.

The detection means allow the chain to be stopped precisely and with no drift.

To that end, at least one, and for example each, link, has at least one aperture capable of cooperating with the detection means, for example photoelectric, in order to control the stopping and starting sequences for the chain.

More particularly, the aperture in the link cooperates with at least one photoelectric device disposed opposite a corresponding aperture provided in the guide rail.

In this case, a first detection causes or triggers a deceleration of the chain initially at nominal speed and, after deceleration caused by the first detection, during motorization at low speed, a second detection triggers a stopping of the chain.

A second object of the invention is a machine for a logistic installation, for example a mail sorting centre.

This machine comprises at least one chain conveyor such as described above.

In one embodiment, the machine comprises at least one or more unloading stations equipped with a transfer device comprising a pendular lever controlled by a connecting rod driven rotationally by a motorization unit, the kinematic connection between the connecting rod and the lever being a sliding connection.

Such a combination makes it possible to combine the advantages of the invention with those of the pendular lever, while providing the stopping precision.

The invention will be understood in more detail from a reading of the description which follows and refers to the accompanying drawings.

In these drawings,

FIG. 2 is a large-scale transverse elevation sectional view of a conveyor mounted on this machine.

FIG. 3 is a simplified longitudinal elevation sectional view along the line III—III of FIG. 2.

FIG. 4 is a longitudinal section elevational view of a fixed-length link of a conveyor chain according to the invention, with its guide rail cut away.

FIG. 5 is a top view of this link.

FIGS. 6 and 7 are sectional elevational views along the lines VI—VI and VII—VII of FIG. 4.

FIGS. 8 and 9 are views similar to FIGS. 4 and 5 respectively, of a tensioning type variable-length link for this chain.

FIG. 13 is a schematic longitudinal elevation view of a link which has sliding means of connecting two parts, for adjusting the length of the chain, and means of immobilization at an appropriate pitch, here clamping screws.

Figure 1:
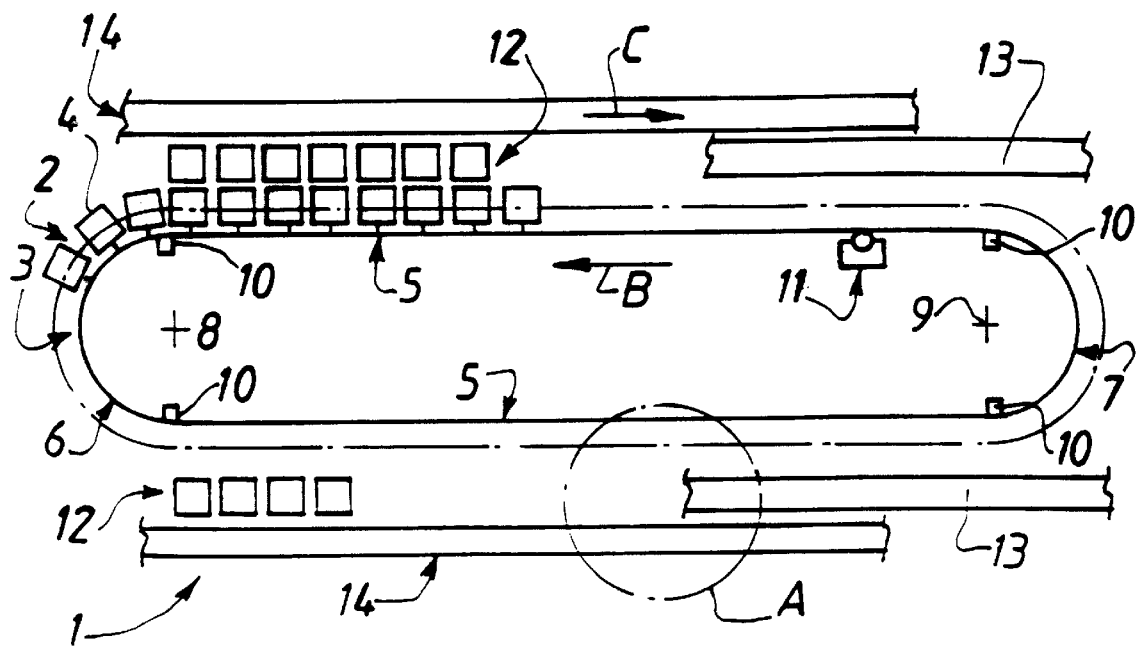
FIG. 1 is a schematic overall top plan view of a partially illustrated machine, and of a conveyor, according to the invention.

There can be seen in FIG. 1 a machine 1 for a logistic installation according to the invention comprising a conveyor or carousel 2.

Before describing the invention, it should be specified that the term longitudinal refers to a direction illustrated by that of the arrows opposite rectilinear sections of the conveyor 2. In these sections, the movement of objects is performed in the longitudinal direction, in one sense or the other.

The terms transverse or lateral refer to a direction in the plane of FIG. 1, and perpendicular to the longitudinal direction.

For simplification, these terms can also be used to describe, including in curved sections, side locations, inside or outside the conveyor.

The term elevation designates a direction perpendicular to the other two.

For further simplicity, it is sometimes considered that the elevation direction is vertical, while the longitudinal and transverse directions are considered horizontal.

It is self-evident that these terms are not limitative, and are directed at clarity. And that parts or constituents of the invention have different positions or orientations, notably during their operation and storage.

It emerges from the figures that the conveyor 2 is of the closed-loop chain type.

It comprises a chain guided by a guide rail 3 and carrying along receiving devices 4 each capable of receiving a three-dimensional object.

Here, each object is an empty handling container made of synthetic material with a low coefficient of friction.

In other embodiments, the containers or objects obviously have different forms, materials or structures.

In the present case, these containers are intended for the sorting machine 1, provided for placing, in each of the containers, objects having a common sorting characteristic, for example their destination.

The rail 3 is formed of four sections, of which two are parallel useful rectilinear sections 5, and two are semicircular loop-back sections 6 and 7, situated at each end of the rectilinear sections.

Each section 6 and 7 has a respective loop-back general geometric axis or centre 8 and 9.

Adjustment devices 10 are disposed at each end of each curved section 6, 7.

Each adjustment device 10 makes it possible to adjust the distance separating the end of the curved section 6, 7 on which it is disposed and the end of the straight section 5 which corresponds thereto.

The adjustment devices 10 therefore make it possible notably to vary the total length of the rail 3.

These devices 10 therefore act on the longitudinal and/or transverse position of the curved section 6, 7 separately or simultaneously, which makes it possible, when the chain is at a halt, and therefore immobilized by the motorization/brake, to shift the portion of chain situated in a rectilinear section 5, with respect to the portion of chain situated opposite in the other rectilinear section.

Other arrangements are provided in yet other embodiments, in order to provide the tensioning of the chain and the locating adjustment.

The configuration of the rail in the rectilinear sections 5 is different from that in the curved sections 6, 7.

In the rectilinear sections 5, the rail provides both the horizontal guidance and the vertical guidance of the links of the chain.

In the curved sections 6, 7, the rail provides only the vertical guidance of the links of the chain, while a substantially horizontal fixed plane track 77 disposed under each curved section 6, 7 provides their horizontal guidance.

This method of guiding the chain is allowed on account of the means of conveying the links of the chain being distinct from their means of guidance.

Each plane track 77 is disposed in direct continuity, with no shift, notably elevation-wise, nor discontinuity, notably longitudinal, with the conveyance surfaces of the rectilinear sections of the rail 3, so that the passage of a conveyance roller from its rectilinear conveyance surface to the track 77 (or vice versa) is made with neither a jump nor a bump.

On the one hand such a track 77 allows (as illustrated in FIG. 6) the trajectory of the conveyance rollers to vary from the inside to the outside of the track depending on the adjustment applied on at least one of the curved sections 6, 7, which here provide the vertical guidance of the chain.

Various trajectories of these conveyance rollers are possible on the tracks 77, in which the radius of these trajectories compared with the geometric axes of the curved sections 6 and 7 is longer for a so-called outer maximum length trajectory, and shorter for a so-called inner minimum length trajectory.

Moreover, the connection between each track and the conveyance surfaces in the rectilinear sections 5, for example the horizontal lower wings of the rail 3, is achieved end-to-end, and therefore with no appreciable jump or discontinuity.

The concave obstruction or hole to be jumped over by the conveyance rollers of the chain in known structures is thus avoided.

It should be specified here that motorization means 11, described in more detail below, make it possible to drive the chain of the conveyor 2.

For each station, the machine 1 also comprises a fixed placing 12 for intermediate reception of the containers, which can be seen in FIG. 2 for example. On leaving the placings 12, the containers are routed on to a removal transporter 14.

Here, the conveyor 2 and the transporter 14 move in opposite directions as shown by the arrows B and C in FIG. 1. The placings 12 are also disposed along two rectilinear sections adjacent and parallel to the rectilinear sections 5 of the conveyor 2, outside this conveyor.

In line with the placings 12, there is disposed a conveyor 13 intended to move buckets by here circulating above the containers, filling them when they are at a halt, by releasing, on the fly, at least part of the initial content of the buckets towards the containers, under the effect of gravity.

In fact, each initially empty container is more or less completely filled with objects sorted according to the aforementioned common characteristic.

This conveyor 13 forms part of the machine 1.

It emerges from FIG. 1 notably that the machine 1 comprises, opposite the straight sections 5 outside the conveyor, removal lines or transporters 14.

In this figure, the fixed placings 12 are sheet metal frames.

The containers transferred initially from the conveyor 2 on to the fixed placings 12 are pushed, at the arrival of a new container originating from this conveyor 2, towards an external transporter 14.

Here the transporter 14 is moved according to an arrow C in the longitudinal direction, in a sense which is the reverse of that of the conveyor 2, but other embodiments make provision for the transporter and the conveyor 2 to go in the same sense.

Other arrangements provide, directly at the output of the conveyor 2, transporters, inclined slides or removal hoppers. These arrangements are found in sorting machines 1 for containers according to their content and/or their destination.

These outputs are, depending on arrangement, disposed parallel to, at an angle less than 45° with respect to the longitudinal direction, or perpendicular to, the rectilinear sections 5 of the conveyor 2.

Once on a placing 12, all the objects in a full container removed on to a given line 14 have a chosen sorting characteristic, and for example are intended to be routed to a common destination in the case of a mail sort.

Also, the line 14 moves its full containers to a location where they are for example made available for removal away from the machine 1.

As will be seen, the conveyor 2 moves forward step by step and stops so that one or more, perhaps even all, the empty containers moved by the conveyor 2 are situated opposite a full container placed on the placing 12 and opposite the removal line 14.

It should be noted here that the transporters 14 are inclined laterally in the direction in which the containers are received, and are at a halt at the time of a transfer from at least one placing 12.

This transfer is commanded when the so-called full container on the placing 12 has reached a desired fill (a maximum in terms of mass or volume, or sufficient in logistic terms, for example for bringing along a necessary new empty container), and a system, here pendular, pushes a new empty container from the conveyor 2, so that it itself pushes the full container towards the line 14 and takes its place on the placing.

Thus, the full container has been removed and replaced by an empty container, in a very short time, for example of the order of two seconds, without stopping operation of the machine 1 except during this removal time and on this filling station alone.

FIGS. 2 and 3 show in more detail a stretch A (FIG. 1) of the assembly which has just been described.

It should also be noted that some embodiments of the invention have one or more than two levels, depending on the machines 1 to be made to cooperate with a central revolving stock offered by a conveyor 2 notably.

For example, a single conveyor 2 equipped with inclined level changing ramps, and arranged as a closed loop, supplies a number of levels of a machine 1.

In FIG. 2, the empty containers 15 of the conveyor 2 and the full containers 16 on the placings 12 are each depicted stopped at a filling and removal station.

In some embodiments, the number of stations is different from that depicted in FIG. 1 or 2, larger or smaller depending on the arrangements necessary, the example in question illustrating only the breadth of arrangement possibilities which can be met by the invention.

It emerges from FIG. 2 or 3 that the conveyor 2, the placing 12, the bucket conveyor 13 and the removal lines 14 are mounted on a chassis 17 of the machine 1.

There may be seen in particular in FIG. 2, the guide rail 3 of the conveyor and fixings 18 of the placings 12.

Only two transfer devices or systems 19 are depicted in FIG. 3.

These devices for transfer 19 of the empty containers 15 from the conveyor 2 to the placings 12 comprise a pendular thrust lever 20 driven by a motorization unit 21 by means of a connecting rod 22.

The connecting rod 22 has one of its ends driven rotationally by the unit 21, always in the same sense, and its other end is mounted sliding in a groove in the lever 20, which is itself mounted swinging around an axis 23.

Thus, a continuous rotation of the motorization unit 21 causes successive pendular movements of the lever 20.

A forward movement and a return movement of this lever are also fast since, in one embodiment, the transfer time is of the order of 2 seconds.

Knowing that the invention allows, in this embodiment, a to-and-from travel of the arm 20 with a duration of the order of 2 seconds, it is possible to set the rate of the machine 1 to substantially 1 step every 4 to 5 seconds approximately.

The conveyor 2 being at a halt, the motorization assemblies 21 are controlled so that, when a full container 16 has to be removed on to a line 14, the arm 20 which is situated in correspondence with this container is set in motion and pushes the empty container 15 which is situated between it and the full container to be unloaded.

The empty container then pushes the full container on to the line 14 and takes the place of this full container on the placing 12.

There can be seen in FIG. 2, in dotted and dashed lines, full containers in the process of being unloaded, in order to illustrate this operation.

In FIGS. 4 and 5, there can be seen a standard link 24, of fixed length, of the chain of the conveyor 2, in its guide rail 3.

The nominal dimension of such a link 24 in the longitudinal direction of the chain is substantially equal to one container loading/unloading step.

The aim in practice is that, when the carousel is at a halt, all the empty containers on board are positioned facing full containers, one to one, in order to provide their replacement under the action of the pendular devices 19.

Thus, one or more, perhaps even all, the empty containers 15 or full containers 16 can be transferred simultaneously in substantially 2 seconds.

In one embodiment, the stopping positions are referred to as "indexed", and are constrained to a tolerance of +/−5 mm at maximum, not accumulated over the length of the chain.

This tolerance also comprises that due to manufacture of the chassis 17 which is of the order of +/−2 mm, and that due to expansion/contraction under an ambient temperature variation here between +5° C. and +32° C.

For such a temperature difference, the elongation to be compensated for of a link 24 made of solid aluminium is of the order of +0 to +0.112 mm with a link of substantially 340 mm.

It should also be noted here that the endless loop carousel chain has an integer number of links and therefore of containers on the total developed length of this chain. This is incorporating the curved sections 6 and 7 of course.

For a precise articulation of the links, the latter are equipped with joints providing a tolerance of the order of +0.005 to +0.029 mm, estimated as an H7/g6 assembly according to the usual designations.

Moreover, the estimated elongation of a link, due to possible wear of the articulations, is of the order here of +0 to +0.05 mm.

Furthermore, it should be indicated that the chain is here formed of stretches of ten links, nine of which are standard links such as 24, these stretches being interconnected by tensioning links, of variable length, which will be described below.

In another embodiment, the tensioning links are replaced by adjustable links such as that which can be seen in FIG. 13, or similar. Such adjustable links are also, in some embodiments, incorporated into a chain provided with tensioning links.

Returning to the link 24 of FIG. 4, it can be seen that it comprises a body 25 made from a metallic bar of rectangular section.

The body 25 is made from solid aluminium or a bar of aluminium, but other materials, such as synthetics, are used in some embodiments.

On the body 25 there are mounted here a conveyance roller 26 with a horizontal axis and two guide rollers 27 with a vertical axis.

One end of the body 25 forms a horizontal male flange 28.

Its other end forms a two-branched fork 29 referred to as a female flange, complementary to the flange 28, for coupling of the links 24 or also the tensioning or adjustable links.

The conveyance roller 26 is mounted on a female flange or fork 30 by means of a spindle 31. Here the roller 26 is mounted on a friction bearing, but ball bearings are provided in some embodiments.

The fork 30 is itself mounted rotating in a recess in the body 25 around a vertical axis, by means of a spindle 32.

A pin 33 makes the fork 30 and the spindle 32 immovably attached rotation-wise, the latter being mounted in a hole in the body 25 on a lining 34 forming a bearing.

A flexible fastening or "clip" 35 holds the spindle 32 longitudinally in the body 25.

The guide rollers 27 are mounted on the body 25 by means of one and the same spindle or shaft 36, which receives them on linings 37. Other embodiments provide, in the place of the linings 37, ball bearings and other rotating structures for rotational guidance.

The spindle 36 passes through the branches of the fork 29 of one link and the flange 28 of the adjacent link, so that it also provides a rotating connection between these two links.

So as to also allow an angular swivelling clearance between these two links with respect to the rest of the chain, a swivel joint 38 is interposed between the shaft 36 and the flange 28.

In practice, the swivel joint here enables an angular clearance in a horizontal plane of several tens of degrees, in order to allow the chain to negotiate the curves of the conveyor 2. These curves are, as mentioned above, plane here, but on a slant in other embodiments.

A few degrees of angular clearance in a vertical plane, and in a spiral with respect to the vertical and horizontal planes, are also allowed by the swivel joint 38.

This chain is therefore also adapted to the inclined level changing ramps.

Other flexible fastenings or "clips" 39 hold the shaft 36 on to the body 25.

Finally, it should be noted that the link 24, and more precisely its body 25, has an oblong aperture 40 of horizontal axis whose automatic control function will be described below.

So as to convey and guide the links 24 (and also the variable or adjustable links described below), the guide rail 3 has, in the rectilinear sections 5, a C-shaped transverse section, which can be seen in FIG. 7 notably.

The C-shaped transverse elevational section has a vertical back 41 and two horizontal wings 42 whose edges 43 are themselves folded vertically.

In this FIG. 7, the conveyance rollers 26 roll along on the lower horizontal wing 42.

And the guide rollers 27 are held in the channels formed between the back 41 and the edges 43.

In some embodiments which are not illustrated, the rail 3 has four corner irons, instead of a set of end-to-end single-piece section parts as here.

In another embodiment, two reversed U-shaped parts, with their concavities facing, replace the C-shaped rail 3.

In the curved sections 6, 7, the guide rail has a C-shaped transverse section whose concavity is turned towards the respective centre 8, 9 of the semicircular-shaped curved section 6, 7.

In the curved sections 6, 7, the lower part of the rail is placed substantially flat on the fixed horizontal track which, at that place, provides the horizontal guidance of the links of the chain.

It can also be seen in FIGS. 4 and 8 that the links 24 and 52 (like the adjustable links described below) have a receiving tray 44 for the empty containers 15.

To that end, a bracket 45 with a substantially S-shaped transverse section is fixed to the body 25 by two bolts 46 and comes out of the guide rail 3 by its lateral opening, between the wings 42.

The tray 44 is fixed to the bracket 45 by means of screws 47. This bracket 45 makes it possible to obtain any desired position of putting a container on board the chain, inclined differently or as in the figures, or horizontal.

The tray 44 is inclined downward with respect to the horizontal, in the direction of movement, i.e. it is inclined from top to bottom, and from upstream to downstream.

Its front edge 48 is folded substantially at 90° in order to retain the container placed on the tray. Its lateral edge 49 situated towards the rail 3, on the opposite side from the placing 12, is folded in the same way, for positioning a container.

An auxiliary conveyance roller 50 is mounted under the tray 44 in order to roll along on a track 51 immovably attached to the chassis 17.

In some embodiments, not depicted, the objects are directly conveyed by the links, whose receiving means are then integrated with the body 25.

It should be noted here that some embodiments provide, with horizontal articulation axes notably, a container reception arranged directly above the links.

There will now be described a tensioning link 52 as depicted in FIGS. 8 and 9.

Apart from what follows, this link 52 is here identical to a standard link 24.

It has in particular the same conveyance and guide rollers, and is also provided with a receiving tray.

In fact, only the body of the link 52 differs from that of a link 24.

It is here implemented in two parts 53 and 54 disposed longitudinally one after the other and connected by one of the tensioning means, here a helical draw spring 55.

The tension power of such means is greater than the maximum motorization force of the chain, and for example in a ratio of the order of 1.3.

In other embodiments, the spring, here mechanical and made of metal, is replaced by tensioning means made of elastically deformable synthetic material, such as polyurethane or similar.

Gas springs or similar are provided in yet other embodiments.

It emerges from the figures that the front part 53 has only the flange for connecting to the preceding link and the front fixing means of the spring 55.

The rear part 54 supports the other devices in the same way as the body 25 of a link 24, and also has the rear fixing means of the spring 55.

The front part 53, sliding with respect to the rear part 54, forms, on its rear side, a fork or female flange 56, between the branches of which a horizontal pin 57 is mounted.

A hooked end of the spring 55 engaged on this pin 57 provides its fixing to the front part 53.

The central part of the spring is disposed in a housing 58 in the front part 54 of the body.

And a horizontal pin 59, placed in a housing 60 in the rear part 54 of the body, makes it possible to fix the rear part of the spring in the same way as its front part.

Now, reference should be made to FIG. 13. It depicts an embodiment of a so-called adjustable link 72.

Like the tensioning links, this link 72 has a front part 53 and a rear part 54, connected by a joining region here comprising a lower plane surface of the part 54 and an upper plane surface of the part 53, one against the other.

Other embodiments make provision for the front part 53 and the rear part 54 to be smooth, interlocking, or connected by tongues.

Here, the plane surfaces are within the link 72, substantially at mid-section elevation-wise.

Front and rear spacings are provided between the parts 53 and 54, one upper front and the other lower rear, in order to allow a plurality of relative longitudinal positions of these parts against one another.

Each position gives the link 72 a chosen length.

The relative immobilization of the parts 53 and 54 is here provided by two screws 73, the threaded end of which is engaged in a clamping tapping 74 of the part 54.

While the body of these screws 73 passes through oblong holes 75, of longitudinal main direction, formed in the part 53.

Other immobilization means are provided in other embodiments.

The adjustment itself is here performed with precision, once the screws 73 are unscrewed, by means of a longitudinal rod 76 with reversed threads.

This rod 76 is on the one hand engaged with a downstream longitudinal tapping in the part 54 and, on the other hand, with an upstream longitudinal tapping in the part 53.

In fact, by rotating this rod 76 with a suitable tool, the gap between the parts 53 and 54 is altered, depending on the direction of rotation, in order to either lengthen or shorten the link 72.

In some embodiments of the invention, at least two adjacent stretches of the chain are connected by an adjustable-pitch link 72, in which the insertion of an adjustment arrangement including the rod 76 allows play to be taken up in the chain.

Figure 10:
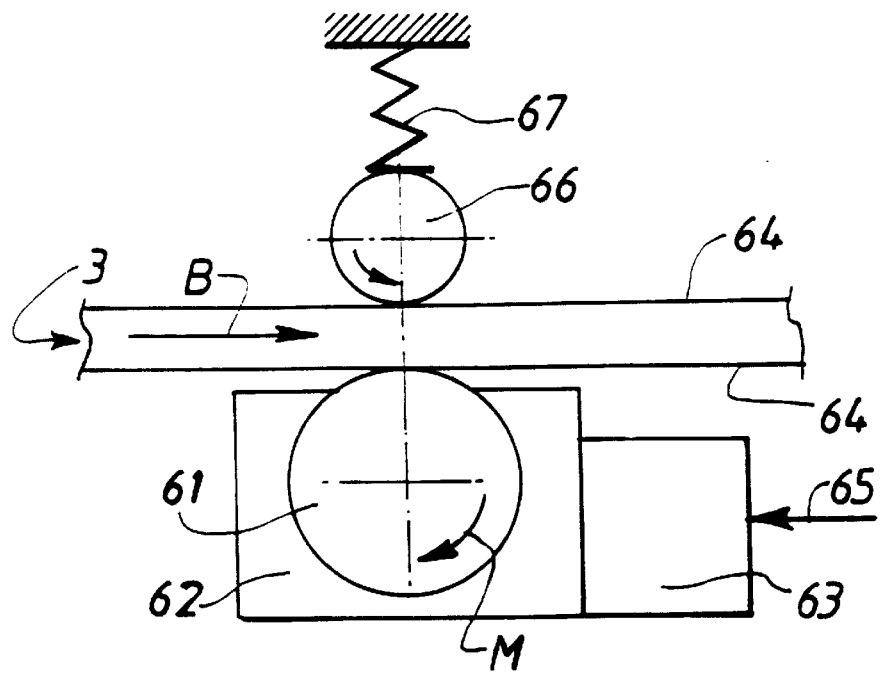
FIG. 10 is a top view diagram of the conveyor motorization unit.

There will now be described the drive along the arrow B of the chain including the links 24 and 52 and/or 72, depicted schematically in FIG. 10.

A smooth drive roller 61, driven as illustrated by the arrow M under the effect of a motor 63, is resting on one of the lateral faces 64, here internal, of the chain. This is therefore an unimpeded tangential and continuous friction drive.

This drive of the roller 61 is here directly transmitted through a reduction gear 62 by a motor 63. In other embodiments, the motorization unit 62, 63 is offset and connected to the roller 61 by a chain or a notched belt.

The drive movements of the motor 63 are controlled by a control unit, from positional information received on a line 65.

On the side of the chain opposite the roller 61, a rotationally free i.e. idle, counter-roller 66 is resting on a face, here external, of the chain.

This counter-roller 66 is pressed on the chain by pressing stress means 67, which are here adjustable as regards position and pressure intensity.

As has already been seen, the motor also makes it possible to immobilize the chain in a fixed position by keeping it pinched between the roller 61 and the counter-roller 66.

Figure 11:
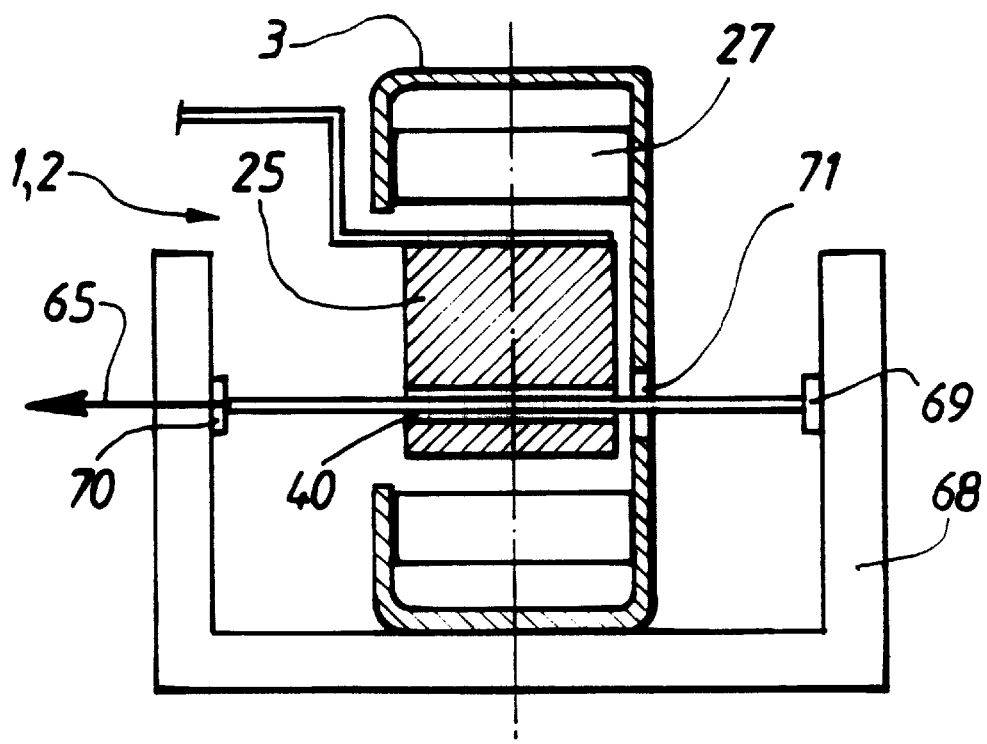
FIG. 11 illustrates, in transverse view, an automatic control sensor of the conveyor.

FIG. 11 depicts means of determining the position of any link 24, 52 or 72 of the chain with respect to a reference location.

These means therefore provide the position of the whole chain to within a multiple of the length of a link, and therefore make it possible to control its operating sequences so that it stops precisely at each step or multiple of steps.

According to this embodiment, at the reference location, a yoke 68 supports, on one side of the chain, a photoemissive diode 69 and, on the other side of the chain, opposite the diode 69, a photosensitive component 70 of the conveyor 2.

An aperture 71 is made in the back 41 of the rail 3 between the diode 69 and the component 70.

It should be noted that the body 25 of the links has an oblong aperture 40. This aperture is disposed at an identical elevation on all the links 24, 52 or 72, so as to be situated on the path of the light ray originating from the diode 69 at the time of passage of the link in the yoke 68.

There is thus available, at the output of the component 70, a signal for the start of illumination of this component and an illumination end signal, separated by a time interval which is a function of the length of the aperture and the speed of forward movement of the chain.

It is these signals, or signals derived therefrom, which are supplied to the control unit of the motor 63 via the line 65.

Figure 12:
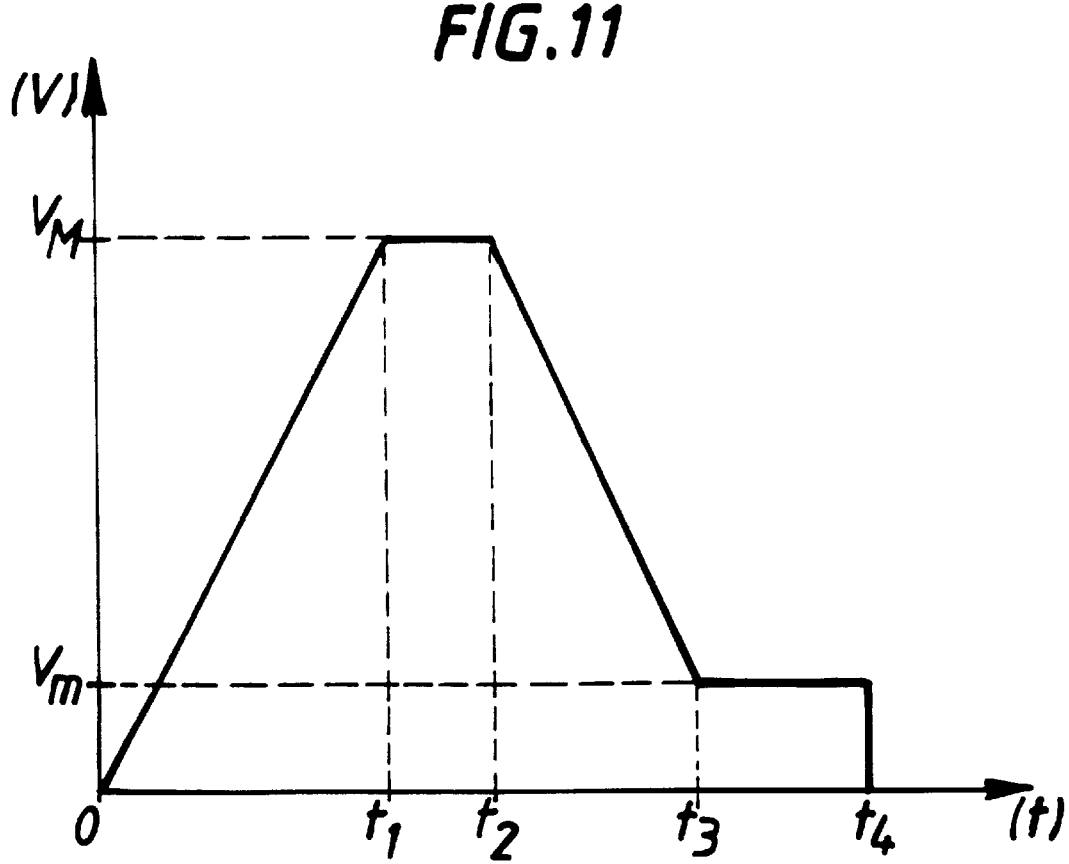
FIG. 12 is an operational diagram of the conveyor.

These signals make it possible to control the motor 63 so as to obtain the operating sequence described with reference to FIG. 12.

This figure is a curve representing the speed V of movement of the chain as a function of time, and therefore of displacement.

The motor 63 is controlled so as to obtain accelerations and decelerations of the chain as a function of time, and consequently speed ramps.

The motor starts at the instant 0 and accelerates up to a speed $V_M$ reached at the instant $t_l$.

From this instant $t_1$, the motor 63 is controlled at constant speed until the instant $t_2$ where the first position signal arrives on the line 65.

The motor 63 is then decelerated until the instant $t_3$ where it reaches the speed $V_m$, and where it is again controlled at low speed. The chain is subject to the same slowing down.

It is next stopped at the instant $t_4$ where the second position signal arrives.

Thus, the motor 63 is already operating at reduced speed when it is stopped, which provides the desired precision.

The slowing down, and a fortiori the immobilization of the chain, are commanded subject to a prior stop request, given by the cell for triggering the stop cycle.

In the absence of a stop request, the movement continues at speed $V_M$ M until the next stop request.

The detection means described here are electroluminescent but, in other embodiments, they are of other types such as electromagnetic or similar.

In one embodiment, three detection means cells are spaced out longitudinally on the path of the chain.

The first cell, the furthest from the desired stopping position, sets up the stop request upon passage of the hole 40 of a link whose object is intended for that position.

A second cell causes the slowing down.

And the third triggers the stopping at low speed.

Like the embodiment mentioned above, the successive detection means cells provide an immobilization of the chain, and therefore of the object opposite its destination station, with no parasitic inertia.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. A closed-loop chain conveyor (2) of three-dimensional objects (15), the chain having stretches with links (24, 52) comprising respectively object receiving means (12), fixed-length links (24) being self-conveyed on a track (51); mutually connected by articulations with small positive operating and wear tolerances; guided in a guide rail (3), and of fixed pitch, substantially equal to the distance between two adjacent object loading/unloading positions;

at least two adjacent stretches being connected by a link (52), which has tensioning means (55) capable of automatically adjusting the distance between its axes of articulation with two adjacent links, by continuously exerting a tension force tending to bring these axes closer together;

conveyor (2) having means of detecting the position of a link, with respect to a destination position where the object has to be loaded/unloaded; connected to a motorization of the conveyor for allowing a uniformly varying and smooth slowing down of the chain at the approach to this location, then of stopping the chain at a reduced conveying speed; and the rail (3) having at least two curved sections (6, 7) and two rectilinear sections (5), each curved section having adjustment means (10) making it possible to move this curve individually, arranged to provide a tensioning of the chain, as well as a relative adjustment of the locating of the straight sections (5) with respect to one another.

2. A chain conveyor (2) according to claim 1, characterised in that it has, on the chain, at least one tensioning variable-pitch link for taking up play.

3. A chain conveyor (2) according to claim 2, in which each link is articulated to one of the adjacent links around the spindle (36) of at least one guide roller.

4. A chain conveyor (2) according to claim 3 in which one end, of each link longitudinally forms a fork (29) or female flange with two branches passed through substantially perpendicularly by the spindle of the guide roller or rollers, and the other end, forms a male flange (28) with a hole through it, arranged to fit between the branches of the fork of another link, with the spindle of the guide roller or rollers passing through this hole.

5. A chain conveyor (2) according to claim 1, in which each variable-pitch link (52) is divided transversely into two parts connected by elastic means (55).

6. A chain conveyor (2) according to claim 5, in which the elastic means of the different variable-pitch links are arranged in order to, in combination, provide the tensioning of the chain residually and permanently.

7. A chain conveyor (2) according to claim 1, in which at least one link on its lower part a conveyance roller (26), and at least one, guide rollers (27), cooperating with a channel in the guide rail.

8. A chain conveyor (2) according to claim 1, in which each link has receiving means (4) for three-dimensional objects, these means being added on to a body of the link (24, 52) or integrated with the latter (24, 52) so that the object is directly supported.

9. A chain conveyor (2) according to claim 8, in which the receiving means (4) comprise at least one receiving tray (44), this limit stop allowing the positional fixing of the object placed on the tray.

10. A chain conveyor (2) according to claim 9, in which the receiving tray (44) is mounted projecting over the link, and is provided with an auxiliary conveyance roller (50), arranged to roll along on a running path (51).

11. A chain conveyor (2) according to claim 1, having at least two substantially rectilinear sections (5), and at least two curved loop-back sections (6, 7), arranged as a closed loop, and in which means (10) are provided in the curved sections for varying the total length of the guide rail (3).

12. A chain conveyor (2) according to claim 11, having two substantially rectilinear and parallel sections (5), and two semicircular loop-back sections (6, 7), arranged as a closed loop, the means (10) for varying the total length of the adjustment rail (3) being arranged so as to adjust the position of the loop-back semicircles.

13. A chain conveyor (2) according to claim 1, in which motorization means (11) comprise at least one drive roller (61) resting on one of the lateral faces of the chain, and a counter-roller (66) rotating freely or idling, with controlled clamping and disposed on the other side of the chain opposite the drive roller.

14. A chain conveyor (2) according to claim 1, in which at least one link has at least one aperture (40) capable of cooperating with detection means, (69, 70), in order to control the slowing down, stopping, progressive acceleration and starting sequences for the chain.

15. A chain conveyor (2) according to claim 14, in which the aperture (40) in the link cooperates with at least one detecting device, disposed opposite a corresponding aperture (71) provided in the guide rail.

16. A chain conveyor (2) according to claim 14, in which a first detection by the photoelectric means causes a smooth deceleration of the chain, and a second detection triggers a precise stop, with no drift, of the chain already at low speed, by means of a no-current brake or similar.

17. A conveyor (2) according to claim 1, characterised in that it forms a revolving stock with a step-by-step forward movement, intended for a mail sorting machine (1) or similar, for the distribution to this machine (1) of empty containers (15).

18. A machine (1) for a logistic installation, notably a mail sorting centre, characterised by the fact that it comprises at least one chain conveyor (2) according to one of claim 1.

19. A chain conveyor according to claim 1 characterized in that it has, on the chain, at least one adjustable pitch link for taking up play.

20. A closed-loop chain conveyor (2) of three-dimensional objects (15), the chain having stretches with links (24, 52) comprising respectively object receiving means (12), fixed-length links (24) being self-contained on a track (51); mutually connected by articulations with small positive operating and wear tolerances; guided in a guide rail (3), and of fixed pitch, substantially equal to the distance between two adjacent object loading/unloading positions;

at least two adjacent stretches being connected by a link (72), by insertion of an adjustment arrangement which allows play to be taken up in the chain, the conveyor (2) having means of detecting the position of a link, with respect to a destination position where the object has to be loaded/unloaded; connected to a motorization of the conveyor for allowing a uniformly varying and smooth slowing down of the chain at the approach to this location, then of stopping the chain at a reduced conveying speed; and the rail (3) having at least two curved sections (6, 7) and two rectilinear section (5), each curved section having adjustment means (10) making it possible to move this curve individually, arranged to provide a tensioning of the chain, as well as a relative adjustment of the locating of the straight sections (5) with respect to one another.

* * * * *